US012427956B2

(12) United States Patent
Jing et al.

(10) Patent No.: US 12,427,956 B2
(45) Date of Patent: Sep. 30, 2025

(54) PREDICTIVE ANTI-LAG BRAKING CONTROL FOR AUTONOMOUS DRIVING

(71) Applicant: TUSIMPLE, INC., San Diego, CA (US)

(72) Inventors: Junbo Jing, San Diego, CA (US); Jingxuan Liu, San Diego, CA (US); Haimo Bi, Tucson, AZ (US); Arda Kurt, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 185 days.

(21) Appl. No.: 18/341,560

(22) Filed: Jun. 26, 2023

(65) Prior Publication Data

US 2024/0017702 A1    Jan. 18, 2024

Related U.S. Application Data

(60) Provisional application No. 63/367,110, filed on Jun. 27, 2022.

(51) Int. Cl.
*B60T 8/17* (2006.01)
*B60T 8/172* (2006.01)

(52) U.S. Cl.
CPC ........... *B60T 8/172* (2013.01); *B60T 2270/88* (2013.01)

(58) Field of Classification Search
CPC ............................ B60T 8/172; B60T 2270/88
See application file for complete search history.

(56) References Cited

U.S. PATENT DOCUMENTS

| 2007/0038357 | A1* | 2/2007 | Leminoux | G01G 19/086 |
| | | | | 701/75 |
| 2012/0277941 | A1* | 11/2012 | Noffsinger | G08G 3/00 |
| | | | | 701/21 |
| 2016/0281845 | A1* | 9/2016 | Pietron | F16H 61/061 |
| 2016/0334790 | A1* | 11/2016 | Rust | B60T 13/662 |
| 2017/0305396 | A1* | 10/2017 | Shiratsuchi | B61L 23/14 |
| 2018/0339685 | A1* | 11/2018 | Hill | B60T 13/662 |

(Continued)

FOREIGN PATENT DOCUMENTS

| DE | 102006001914 A1 * | 7/2007 | B60T 7/22 |
| WO | 2020104066 A1 | 5/2020 | |

(Continued)

*Primary Examiner* — Joseph J Dallo
(74) *Attorney, Agent, or Firm* — Perkins Coie LLP

(57) ABSTRACT

Devices, systems, and methods for predictive anti-lag braking control for autonomous vehicles are described. An example method of controlling a vehicle includes receiving, from a controller, a first plurality of values indicative of a brake wheel torque demand associated with a deceleration profile of the vehicle, deriving, based on the first plurality of values and a steady-state brake model, a second plurality of values indicative of a brake pressure demand, wherein an input to the steady-state brake model comprises the brake pressure demand and at least one previous brake wheel torque demand, and wherein an output of the steady-state brake system comprises a current brake wheel torque demand, generating, based on the second plurality of values and at least the steady-state model, a plurality of brake control commands, and controlling, using the plurality of brake control commands, the air brake system.

15 Claims, 12 Drawing Sheets

(56) References Cited

U.S. PATENT DOCUMENTS

2020/0010062 A1\* 1/2020 Switkes ................ B60T 8/1887
2020/0331447 A1\* 10/2020 Lee ....................... B60T 17/221
2022/0242413 A1\* 8/2022 Jing ...................... B60W 10/10

FOREIGN PATENT DOCUMENTS

WO     WO-2023283667 A1 \*   1/2023     ........... B60T 13/586
WO     WO-2024121887 A1 \*   6/2024

\* cited by examiner

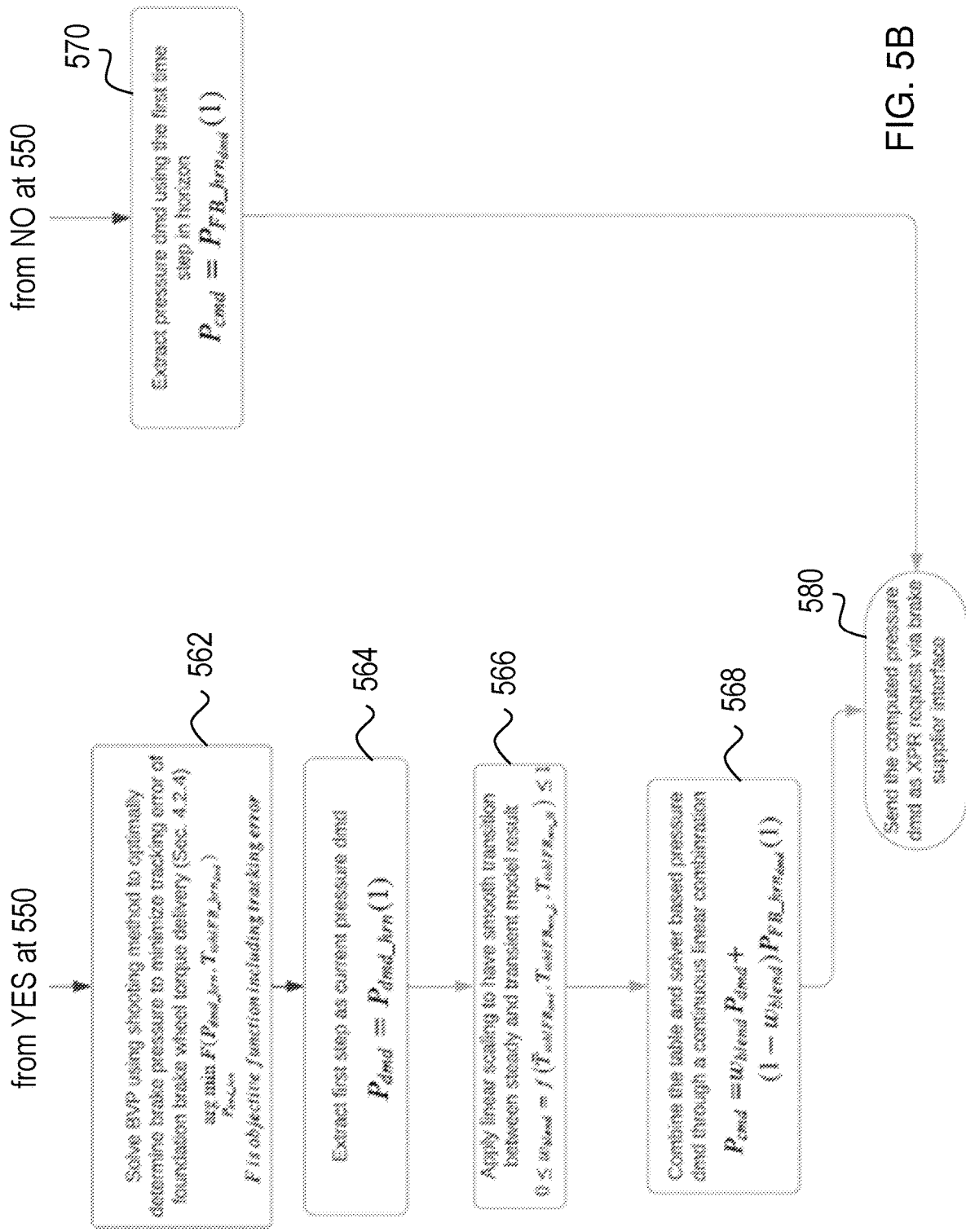

Algorithm 1 Foundation Brake Pressure Command Determination

1: $n \leftarrow 1$
2: while $\|E\|^2 > \epsilon$ or $n \leq n_{max}$ do
3:     Compute $\vec{F}(\vec{X}_n)$ based on Eq 122
4:     if n == 1 then
5:         Compute $\overline{\overline{A}}_1$ based on Eq 114
6:     else
7:         $\overline{\overline{A}}_n$ is obtained from previous step
8:     end if
9:     Update the pressure trace $\vec{X}_{n+1}$ by Eq 115
10:    Compute $\vec{F}(\vec{X}_{n+1})$ based on Eq 122
11:    Get $\Delta \vec{X}_n$ and $\Delta \vec{F}_n$ using Eq 116 and 117
12:    Compute $\overline{\overline{A}}_{n+1}$ using Eq 118
13:    $n \leftarrow n + 1$
14: end while

FIG. 6

PREDICTIVE ANTI-LAG BRAKING CONTROL FOR AUTONOMOUS DRIVING

CROSS-REFERENCE TO RELATED APPLICATIONS

This patent document claims priority to and the benefit of U.S. Provisional Application No. 63/367,110, filed on Jun. 27, 2022. The aforementioned application is incorporated by reference herein in its entirety.

TECHNICAL FIELD

This document generally relates to controlling vehicles, and in particular, generating anti-lag brake control commands for autonomous vehicles.

BACKGROUND

Autonomous vehicle navigation is a technology for sensing the position and movement of a vehicle and, based on the sensing, autonomously control the vehicle to navigate towards a destination. Autonomous vehicle control and navigation can have important applications in transportation of people, goods, and services. Efficiently generating commands for the brake system of a vehicle that enable its accurate control is paramount for the safety of the vehicle and its passengers, as well as people and property in the vicinity of the vehicle, and for the operating efficiency of driving missions.

SUMMARY

Devices, systems, and methods for predictive anti-lag braking control for autonomous vehicles are described. In an example, this is achieved by receiving estimates of the brake wheel torque demand, which is not directly observable, and deriving, based on the brake wheel torque demand and using a steady-state brake model, the brake pressure demand. The brake pressure demand is transformed into brake control commands using the steady-state brake model and a transient-state brake model, which accounts for the lag between the activating the brake pressure and applying the brake wheel torque due to the pneumatic components of the foundation brake (or air brake) system of the autonomous vehicle. The described embodiments advantageously meet the high-precision and high-reliability requirements of L4 autonomous driving systems.

In yet another aspect, the methods described in this document are embodied in the form of processor-executable code and stored in a computer-readable program medium.

In yet another aspect, a device that is configured or operable to perform the methods described in this document is disclosed. The device may include a processor that is programmed to implement this method.

The above and other aspects and features of the disclosed technology are described in greater detail in the drawings, the description, and the claims.

BRIEF DESCRIPTION OF THE DRAWINGS

FIGS. 5A and 5B show a flowchart of an example algorithm for foundation brake pressure determination.

FIG. 6 shows an example algorithm for foundation brake pressure determination.

DETAILED DESCRIPTION

Figure 1:
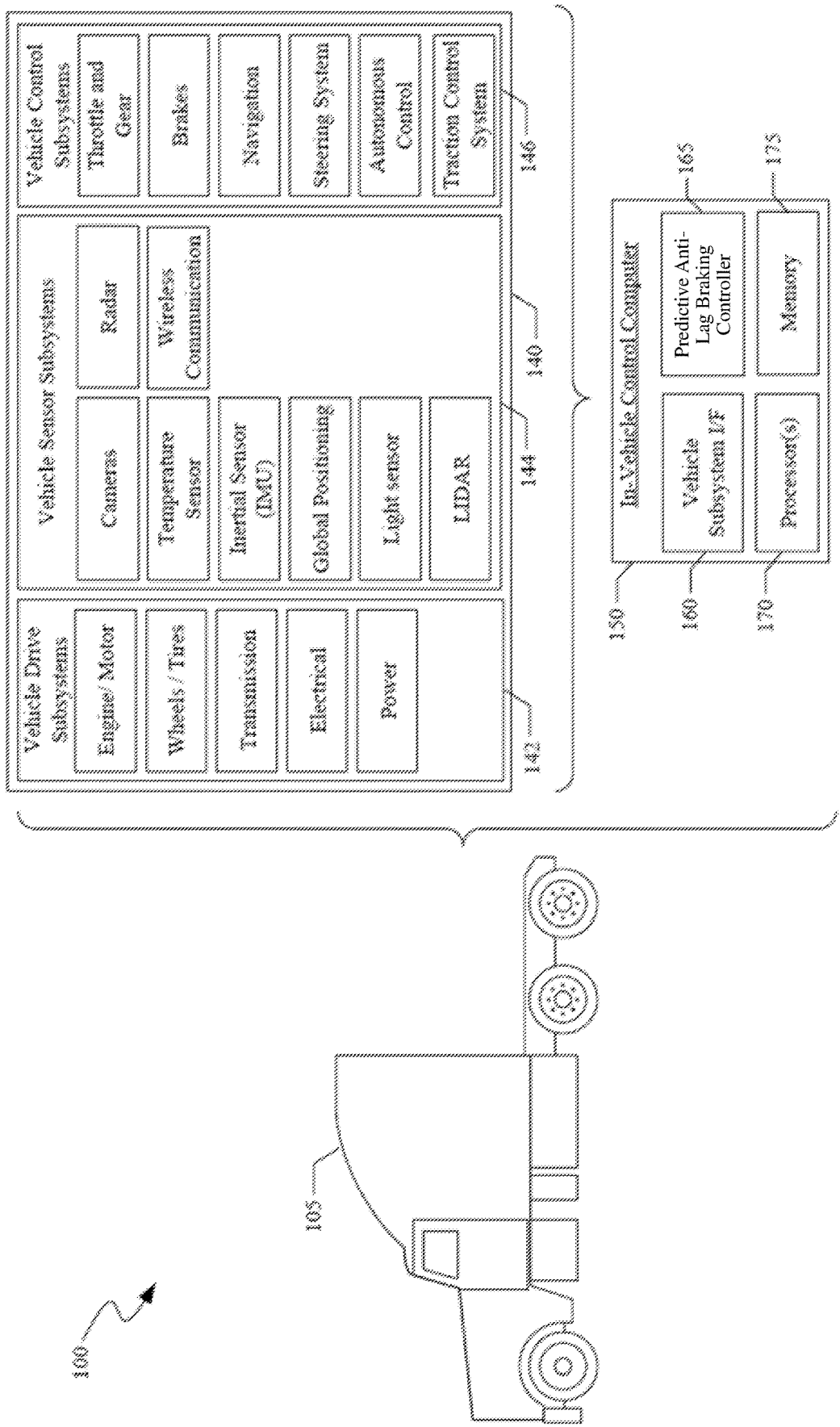
FIG. 1 shows a block diagram of an example autonomous vehicle ecosystem in which an in-vehicle control computer located in the vehicle comprises a predictive anti-lag braking controller.

The transportation industry has been undergoing considerable changes in the way technology is used to control the operation of vehicles. As exemplified in the automotive passenger vehicle, there has been a general advancement towards shifting more of the operational and navigational decision making away from the human driver and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Different types of autonomous vehicles have been classified into different levels of automation under the Society of Automotive Engineers' (SAE) J3016 standard, which ranges from Level 0 in which the vehicle has no automation to Level 5 (L5) in which the vehicle has full autonomy. In an example, SAE Level 4 (L4) is characterized by the vehicle operating without human input or oversight but only under select conditions defined by factors such as road type or geographic area. In order to achieve SAE L4 autonomy, vehicle control commands that are generated include brake control commands.

Braking control is both essential and critical in achieving safety and reliability in autonomous vehicles regardless of their level of autonomy, but especially for Level 4 (L4) autonomous systems as defined in SAE J3016, in which the automation is configured to operate without human intervention under specific conditions, when all of the conditions are met, but wherein a human still has an option to override the autonomous driving system. For L4 systems, the braking control architecture must exhibit a level of robustness that enables it to handle any kind of failure to ensure the safety of the autonomous vehicle and both persons and property in the area surrounding the vehicle.

The traditional human-driven Class 8 vehicle (e.g., a vehicle with a gross vehicle weight rating (GVWR) that exceeds 33,000 lbs.) has an engine brake and a foot brake for drivers to apply a brake force to slow down the vehicle. Current implementations may also include an anti-lock brake system, which is a passive safety mechanism to prevent vehicle instability. However, these existing techniques are not sufficient for fully autonomous vehicles (e.g., as described in FIG. 1) that need more precise braking solutions. This is especially true because most (if not all) Class 8 vehicles have a foundation brake (or air brake) system, which relies on pneumatic components (as compared to fluid-based hydraulic braking systems in most sedans).

FIG. 1 shows a block diagram of an example vehicle ecosystem 100 in which an in-vehicle control computer 150 located in the autonomous vehicle 105 may include a predictive anti-lag braking controller that can account for the lag effects of the pneumatic components of the foundation brake system. As shown in FIG. 1, the autonomous vehicle 105 may be a semi-trailer truck. The vehicle ecosystem 100 may include several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network controller to communicate with devices in the vehicle subsystems 140.

The autonomous vehicle 105 may include various vehicle subsystems that support of the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an 02 monitor, a fuel gauge, an engine oil temperature, etc.,). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The LiDAR unit may be a spinning LiDAR unit or a solid-state LiDAR unit. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating torque of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an anti-lock brake system (ABS) that can prevent the brakes from locking up when the brakes are applied. Additionally, the brake unit may include an engine braking system. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the predictive anti-lag braking controller 165 as explained in this document. For instance, the processor 170 executes the operations associated with predictive anti-lag braking controller 165, which can be configured to leverage the brakes in the control subsystem 146. The operations of the predictive anti-lag braking controller 165 are further described in this document.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

In some embodiments, the described methods, devices, and systems are directed to SAE L4 autonomous driving dynamic control systems, which cover SAE L1-L3 driving assistance applications, semi-autonomous systems, and expand to the full coverage of vehicle dynamic control needs in real-world driving, which may include lane changes, merging into traffic, navigating highway on/off ramps, passing through intersections, maneuvering through congested traffic, parking, and docking operations, etc. In contrast to conventional systems that focus on a single control target, embodiments of the disclosed technology are part of the processing of a control mission that involves control targets defined in multiple dimensions and which are typically time-varying.

Embodiments of the disclosed technology provide methods and systems for predictive anti-lag braking control, which enables their use of vehicles with air brake systems that experience a non-trivial response lag due to the pneumatic components in the air brakes. The predictive aspect of the described embodiments advantageously ensures that the system does not react to the response lag, but rather compensates for it so that any resulting error is minimized, thereby maintaining reliable braking precision in autonomous vehicles.

Section headings are used in the document to improve readability of descriptions and do not in any way limit the discussion or the embodiments to the respective sections only.

1 Overview of Actuator Domain Solutions

In the vehicle wheel domain (as detailed in U.S. patent application Ser. No. 17/164,207, which is incorporated by reference herein in its entirety, and also referred to as the wheel torque domain), an array of wheel torque values, which include the wheel propulsion torque and the wheel brake torque, are generated over each future horizon step. However, both wheel propulsion torque (which is generated by the engine) and wheel brake torque (which is generated by the engine, the air brake pressure reservoir, or a mixture of the two) do not act directly on the vehicle wheels, and thus, the wheel torque values are not directly executable, e.g., they cannot be sent directly as wheel commands. This necessitates that the optimal control commands solved in the wheel torque domain need to be converted to the actuation domain, which may include (1) engine propulsion torque demand or throttle pedal position demand, (2) engine brake torque demand, and (3) foundation air brake pressure demand.

In some embodiments, the wheel-to-actuation domain processing requires at least two conversion operations, e.g., converting the torque delivered from the engine to the wheels and converting the torque from the air brake reservoir to the wheels. Two conversion operations, and consequently two models, are required because the underlying processes for these operations are physically isolated with completely different mechanical properties.

The mechanism between the engine and the wheels is characterized by connections that are relatively rigid because they are implemented using metal parts, but include switching planes due to the discrete-ratio gearbox present therein. This can be modeled using a simple rigid body model, which achieves practical accuracy without causing noticeable performance issues, despite the transmission's mechanical properties being modeled using a spring-mass-damper process.

The mechanism between the air brake reservoir and the wheels is characterized by the torque being originated by pressure from compressible air, which is passed through long deformable tubes with multiple valves in between. This may cause a significant lag effect, which may result in a noticeable control precision performance degradation if it is ignored or overly simplified.

Embodiments of the disclosed technology use predictive control and a lag model to generate wheel torque demand for a future horizon time, which compensates for the response lag effect in the wheel-to-actuation domain conversion. The added complexity of the described embodiments results in improved accuracy and reliability of the resulting estimates, and incurs a trivial computational time penalty (e.g., typically less than 0.2 msec).

Although the two conversion operations in the wheel-to-actuation domain processing are mechanically isolated, they are not isolated computationally. The wheel brake torque is the sum of wheel brake torque sourced by the engine brake and wheel brake torque sourced by the foundation air brake. From a model perspective, neither of these two sources generate fuel consumption costs (unlike the propulsion torque), and thus, the impact of these two sources on the driving cost criteria are the same. Thus, in the vehicle wheel domain, the two sources can be combined into a single decision variable, which mitigates numerical complexity and the risk of convergence failure in model predictive control. However, this results in needing to separate (or rather, reassign) the two sources in the actuation domain and to decouple their conversion operations.

In some embodiments, the decoupling can be performed as follows. First, the capacity boundary of the engine brake wheel torque can be established by a powertrain model and an engine brake usage rule set. Second, a preference for using the engine brake whenever possible due to the practically zero cost operation is established. Based on these two rules, subtracting the maximum amount of permissible engine brake wheel torque for a given solved optimal future vehicle speed state from the total wheel brake torque is the amount of wheel brake torque that the foundation brake should deliver.

In some embodiments, this can be implemented by (1) expanding the optimal control solution (e.g., quadratic programming) into wheel domain actuation demand horizons, which include wheel torque capacity constraints and cost components diagnostics, (2) wheel-to-actuation domain conversion processes, wherein an optimization sub-problem of an anti-lag brake solver exists (as described in Section 2), and (3) special handling for vehicles without a direct torque control interface at the propulsion side, which may include throttle map inversion and a partial clutch controller model.

2 Foundation Air Brake Anti-Lag Solver

Embodiments of the disclosed technology provide methods and systems to predictively counteract the lagging effect due to the pneumatic nature of an air brake system, in order to precisely delivery the amount of wheel torque demanded by higher-level controllers (e.g., mission planning, vehicle control, etc.). In some embodiments, the foundation air brake solver is implemented using the model predictive control (MPC) framework to benefit from the prediction horizon advantage under the MPC frameworks of other modules of the autonomous vehicle. However, different from other modules that optimize the torque impact of vehicle dynamics through various driving objectives, the foundation air brake solver is solely focused the highest accuracy objective when determining the pressure demand sequence that corresponds to the required future wheel torque delivery. From a software architectural perspective, the foundation air brake solver is the slave controller on brake actuation, and follows the master controller on wheel torque determination for optimal driving dynamics. Isolating the low-level brake control's formulation into a stand-alone MPC problem breaks down the total non-linearity and complexity that an optimization solver needs to handle, which improves both computation efficiency and software development and maintenance flexibility.

2.1 System and Interface

2.1.1 Foundation Air Brake Mechanical System

A conventional brake system in human driven vehicles contains six components: air compressor, reservoirs, foot valve, brake chambers, automatic slack adjusters and drum brakes. The compressor is the energy source of the whole system which is driven by engine shaft. The reservoir stores the compressed air to be sent out to the brake chambers. The foot valve is triggered by driver pressing which controls if compressed air is delivered to the chamber. In the autonomous vehicle application, this is replaced by electronic control demand. Herein, the slack adjuster serves two purposes; the first, to convert the linear motion from brake chamber rod to rotational motion to drive the drum brakes, and the second, to automatically adjust to maintain lining to drum clearance under system drift due to wear and tear. The brake force is exerted when S-cam drives the brake lining to press on brake drum which is mounted with the tire. The pipeline system transferring compressed air can be long for semi-trucks, which introduces delay between the pressure command to the actual pressure delivery at the brake chamber. Furthermore, delay is introduced from chamber to the actual expansion of the drum brake.

2.1.2 Pressure-based Brake Controller Interface

Figure 2:
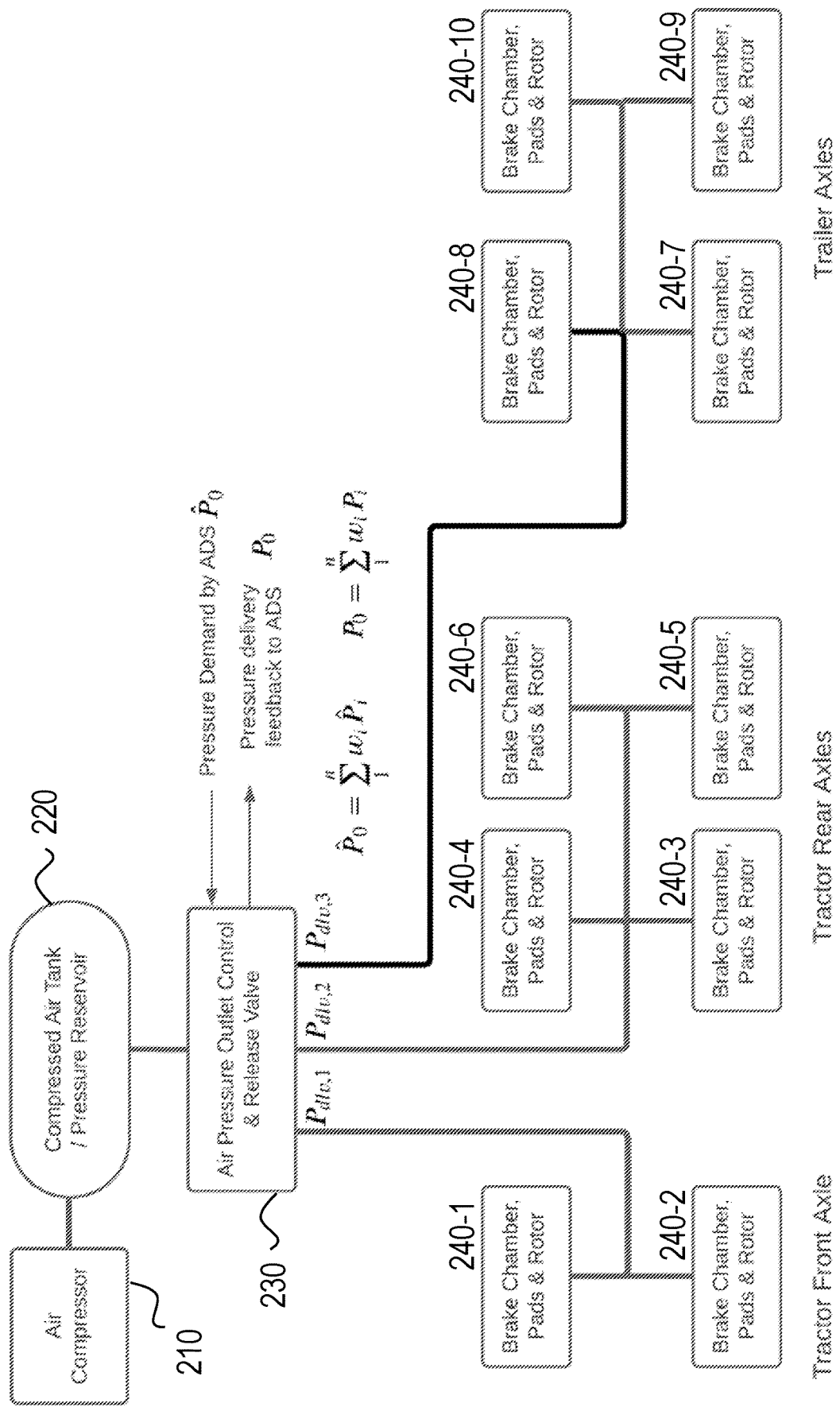
FIG. 2 shows a block diagram of an example brake system for controller design.

FIG. 2 shows an example layout of a Class 8 truck foundation air brake system with integrated autonomous control. It is noted that the brake system pipeline layout in actual trucks is, in fact, much more complicated than this conceptual layout. As shown in FIG. 2, the air compressor 210 is the energy source for the system, with the compressed air tank/pressure reservoir 220 storing the compressed air to be sent to the brake chambers 240-1, . . . , 240-10, via the air pressure outlet control and release valve 230.

In some embodiments, and for an upper-level control system that focuses on vehicle motion control, the brake system may provide the input pressure demand that is treated as a weighted sum of the pressure demands (or targets) for each brake chamber (corresponding to each axle or corner of the tractor and trailer vehicle). Internal to the brake system, there may be a lower-level control system that focuses on controlling the delivery of pressure to each brake chamber, in response to the pressure assignment logic. Typically, both the pressure assignment logic and the pressure delivery control, are internal and proprietary to the brake system suppliers. A performance requirement on the brake system side may require that the weighted sum of pressure delivered to each corner matches the total pressure demand from the autonomous side to the brake system side with minimal error.

However, the use of the upper-level control system on the vehicle motion control side is affected by the fact that the reported pressure delivery does not necessarily represent the exact amount of pressure on the brake pad or rotor pairs due to various practical restrictions on where the pressure sensor can be mounted. Therefore, it is common to have non-trivial lengths of pneumatic tubing between the point where pressure delivery is controlled and where it is measured on the brake pad or rotor pairs. This tubing may introduce lag and distortion effects from the pneumatic nature of air pressure delivery. Even if the pressure is exactly reported from the chambers, it takes a dynamic process to engage the friction bite in between pads and rotors, and to load up tires and suspensions to pass the deceleration effect onto the vehicle body. This implies that brake pressure delivery cannot be directly mapped to equivalent wheel brake torque, and a transfer function is required to factor in the pressure lag and mechanical load up process to rate the torque effect on vehicle body.

2.1.3 Motion Control Operation with the Foundation Air Brake

Foundation air-brake system used on Class 8 trucks inherently contains a major response lag and delay due to the pneumatic components therein. The response lag is characterized by the time & magnitude difference, from brake torque implication based on brake pressure demand, to the brake system's actual delivered equivalent wheel torque impact on the vehicle. Such response lag varies by brake hardware layout, vehicle maintenance condition, brake system software version, pressure demand magnitude, pressure demand rate, etc. The response lag can be more than 0.5 second along with distorted delivery profile. If untreated, the vehicle can experience delayed braking effect, insufficient braking delivery, and excessive braking delivery over different conditions. These symptoms not only degrade autonomous driving smoothness performance, which can even impact perception system operation quality due to the jerk propagated to camera and Lidar system, but also imposes a safety hazard from the unexpected vehicle motion being outside the high-level risk quantification range.

The conventional brake acceleration control approach involved in L2 autonomy (driver assistance) is normally a passive control system, and uses, for example a PID method to track a single target deceleration demand. This design lacks methods to counteract the delay and lag effects contained by the mechanical system of braking. Control precision quality is compromised by unpredictable errors in form of under-delivery or overshoot, and can be a mixed sequence of both during highly dynamical braking events. Such issues are inherent to a passive control system's information exposure, that without a future horizon indicating demand changes along the time, the control decision can only react to system response error feedback in accordance to a new demand point. However, in a L4 autonomous driving system equipped with traffic prediction and predictive decision making, future brake deceleration demand can come in form of an array by time sequence horizon. Therefore, a correspondingly designed predictive control system, can generate the control demand based on the knowledge of brake response property through system modeling, such that the existing delay and lag effect can be pre-treated by calculating the compensating control actuation that matches the model future time response trace onto the future demand sequence.

2.2 Model for Foundation Air Brake Torque Delivery

In some embodiments, the brake controller can be designed in a modularized method, where the brake controller focuses on the determination of the brake pressure demand to meet the upper-level's wheel brake torque demand with the highest precision. Therefore, the brake response model is designed to define brake pressure as an input and the foundation brake wheel torque as the output. Note that the foundation brake wheel torque defined is the lumped equivalent wheel torque for all braking wheels of the tractor trailer train. This value has to be quantified through estimation methods because it is impractical to measure this value with sensors. Using a vehicle acceleration signal, either offline processed or online fuse estimated, depending on the application purpose, foundation brake wheel torque can be estimated using vehicle longitudinal models of powertrain and vehicle dynamics. Torque delivery estimation by braking is aligned with the torque impact on longitudinal dynamic from powertrain, which runs with well-calibrated online torque reports.

As discussed below, the model for describing the dynamics from foundation brake pressure to equivalent wheel brake torque contains two parts: a steady-state model of the system response that is a correlation based on a pressure-torque direct mapping, and a transient-state model that handles the torque delivery delay and lag effect in the dynamics.

2.2.1 Steady-State Response Model

The steady-state response model is generated based on collecting a large amount of road test data with different trailer loads, and then estimating the total wheel torque using offline filtered driving dynamic data and an online estimated torque-dynamic correlation model. Wheel torque by braking is then isolated from non-brake factors' impact, e.g., road grade, driveline friction, driveline disturbances in gear shifting, to make the torque data representation correspond to the foundation brake's generated component. The torque effect of the braking that is included in the steady-state response model primarily consists of the twisting force of generated by the brake camshaft when the foundation brakes are applied.

Figure 3:
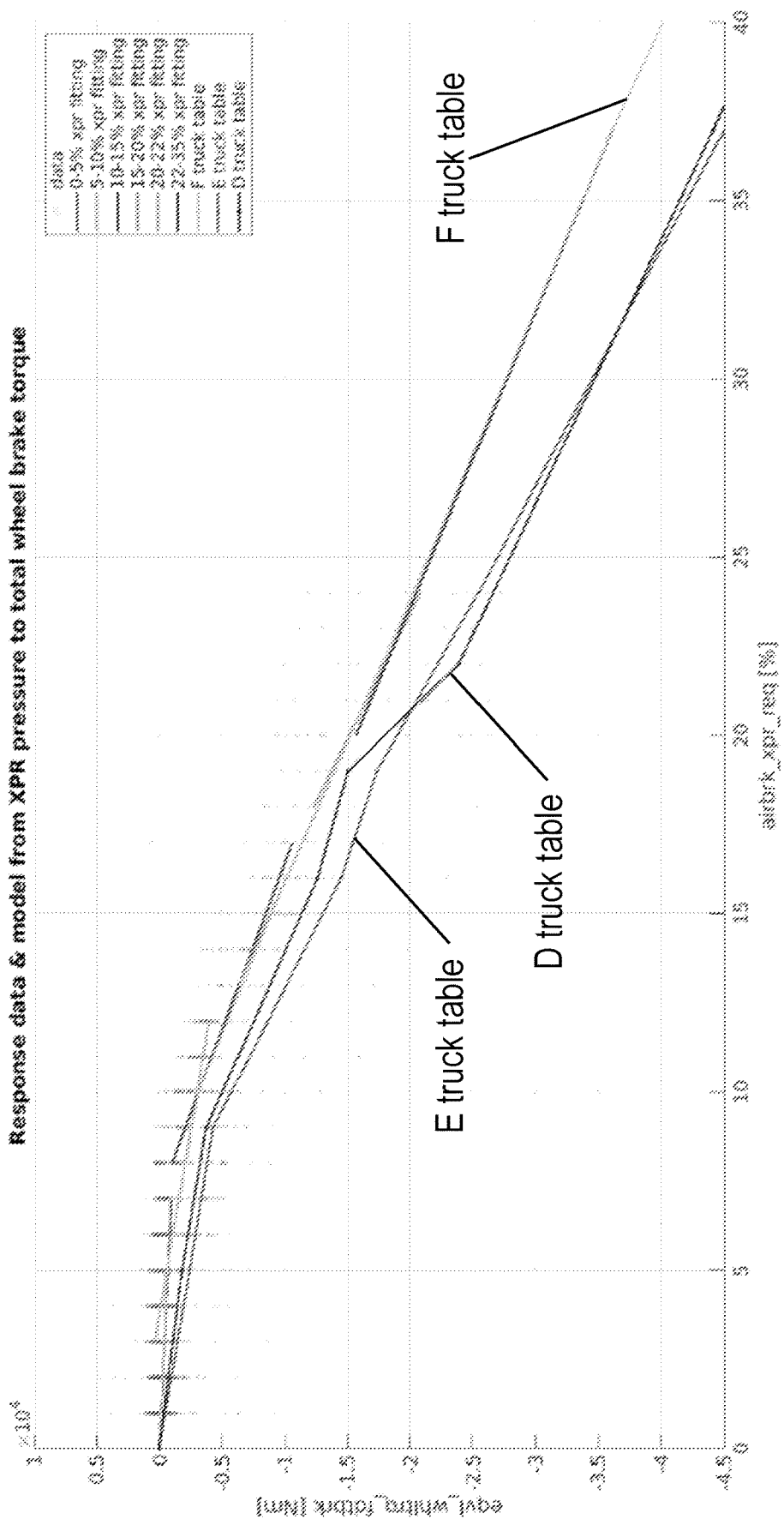
FIG. 3 shows an example of a foundation (air brake) steady-state model generated based on data collected from autonomous trucks.

Overlaying the processed wheel brake torque delivery data with brake pressure data, while disregarding the inherent time series dynamic consequence, the pressure-torque correlation can be regarded as the steady-state model. Various linear functions are fitted on different data regions to model the correlation, using linear least square method. The intersecting points of those linear functions are then read to formulate the 1-D lookup table for pressure-torque conversion, an example of which is shown in FIG. 3.

2.2.2 Transient-State Response Model to Capture Lag Effect

The steady-state model assumes instantaneous delivery of wheel torque for any brake pressure following rigid body effect. Although this is never true for a practical mechanical system, it is usable to some extent. The model is regarded as unusable, when such an assumption causes an integration failure. As mentioned in the above section, the steady state model generation neglects the time-domain dynamic effect.

The transient-state model compensates for the deficiency of the steady-state model, which is based on the physical reasons for the air brake torque delivery lag effect (as explained in Section 2.1). The mismatch of steady-state rigid-body model estimated torque and the total wheel brake torque estimated from the driving dynamics, is regarded as the torque lag component. Due to the potential energy difference, releasing pressure residual in a brake line after an impulse of brake pressure delivery is significantly slower than pumping up brake torque application from the high-pressure reservoir. Therefore, this model is mainly focused on the lag effect of releasing brake pressure because lag data of such a process is significantly more impactful than its counterpart when the pressure is ramping up.

In some embodiments, the brake torque lag component of current time step is denoted as follows (where ss is used to abbreviate the steady-state model), by deliberately eliminating the lead component:

$$T_{whlFB\_lag\_ss_k} = \min(\dot{T}_{whlFB_{k-1}} - T_{whlFB\_ss_k}, 0) \qquad (90)$$

The results of an offline analysis suggest this lag model only needs to take the magnitude and the change rate of pressure demand as the external inputs to form a first-order lag model. Adding more inputs or higher order model components though improves data fitting accuracy, but makes lag effect prediction much less reliable, considering the prediction time length used in MPC, the fact that open loop prediction is used, and the difficulty in acquiring useful 2nd order differentiation for onboard application. For notational purposes, the change rate of pressure demand is denoted as:

$$\dot{P}_{dmd_k} = (P_{dmd_k} - P_{dmd_{k-1}})/dt \qquad (100)$$

The rate of change of the lag term is modeled as a function of $T_{whlFB\_lag_k}$, $P_{dmd_k}$ and $\dot{P}_{dmd_k}$ as shown in Eq. (102). Each term reflects how lag dynamics behaves based on data collected. As shown in the $k_{lag} T_{whlFB\_lag\_ss\_k-1}$ term (and assuming $k_{lag} \leq 0$) based on system identification the larger the lag magnitude, the slower the lag term increases negatively. From a system stability perspective, $k_{lag}$ needs to be negative for system stability, which is consistent with the identified result. The lag change rate is also considered to be proportional to the pressure demand as shown in term $k_{prs} P_{dmd_k}$. This matches the observation that higher pressure, the faster the lag grows. The last term describes the behavior of wheel torque lag with respect to $\dot{P}_{dmd_k}$. Furthermore, $b_{ratio}$ reduces when $\dot{P}_{dmd_k}$ decreases given that $b_{fade_{static}}$ is negative based on the model identified. This term describes that as pressure drops, the lag change rate reduces.

$$k_{lag} \leq 0, k_{prs} \leq 0 \quad (101)$$

$$\dot{T}_{whlFB\_lag_k} = k_{lag}(T_{whlFB\_lag\_ss_k}) + k_{prs}P_{dmd_k} + b_{fade} \quad (102)$$

$$b_{ratio} = 1 - \frac{\dot{P}_{dmd_k}}{b_{fade_{staise}}} \quad (103)$$

$$0 \leq b_{ratio} \leq 1 \quad (104)$$

$$b_{fade} = b_{fade_{max}} b_{ratio} \quad (105)$$

Once the foundation brake wheel torque lag dynamics is identified, $T_{whlFB\_lag_k}$ can be approximated using the forward Euler equations as follows.

$$T_{whlFB\_lag_k} = T_{whlFB\_lag_{k-1}} + \dot{T}_{whlFB\_lag_k} \Delta t \quad (106)$$

$$T_{whlFB\_lag_{min}} \leq T_{whlFB\_lag_k} \leq 0 \quad (107)$$

In Eq. (107), a lower bound is set for the lag term to avoid an unrealistic lag term.

2.2.3 Blended Response Model

In some embodiments, the foundation brake torque is estimated by combining the transient-state model-based lag term with the steady-state model term. In order to achieve a smooth function plane for the solver to invert the model for pressure demand calculation over a horizon, a pressure based weighted sum is applied as shown in Eq. (109), to gradually fade in/out the significance of the lag term. The $\hat{T}_{whlFB_k}$ is used as the predicted torque output that accounts for lag dynamics for the pressure determination to minimize the tracking error of the foundation brake wheel torque delivered. Besides using this model in pressure determination, it can also be used to estimate the foundation brake wheel torque given the current brake pressure. The next step is to design model based optimal solver to determine the pressure request sent to brake supplier interface.

$$k = (1 - k_{min})\frac{P_{dmd_k}}{P_{dmd_{min}}} + k_{min}, k \leq 1 \quad (108)$$

$$\hat{T}_{whlFB_k} = T_{whlFB\_ss_k} + kT_{whlFB\_lag_k} \quad (109)$$

As discussed above, both the steady-state response model and the transient-state response model, and consequently the blended response model, are formulated such that the brake wheel torque demand is a function of the brake pressure demand. However, the described embodiments derive the brake pressure demand given the brake wheel torque demand, i.e., an inverse model must be solved to generate the brake pressure demand. In some embodiments, brake wheel torque demand may represent how much torque is to be applied to the brake wheel to achieve a desired braking performance.

For the steady-state response model, solving the inverse model includes using a 1-D lookup table because the relationship between pressure and torque is modeled using linear functions (as discussed in § 2.2.1). In contrast, solving the inverse model for the transient-state response model (as discussed in § 2.2.2) includes iteratively solving a boundary value problem (as discussed in § 2.4).

Numerical results validate the prediction accuracy of the foundation brake pressure lag model in various high deceleration scenarios. The model well compensates the lookup table conversion for wheel brake torque estimation/prediction, when the foundation brake cannot immediately release brake air pressure residual quick enough.

2.2.4 Online Adaptive Model and Offline Static Model

In some embodiments, the foundation air brake torque deliver model described above is designed to be non-adaptive when vehicle operates in real time. This is for at least the following reasons: (1) Useful heavy brake events for model adaptation are sparse during a typical active driving trip, and the model should be ready for the first heavy brake events; (2) The critical model output of wheel torque information is not directly measurable and requires a secondary estimation. Especially when isolating the brake torque component out of the total wheel torque estimation, driveline torque component is not directly measurable either and contains high disturbance dynamics. (3) Low event information ratio out of noisy state estimations creates a high risk of model overfitting, and therefore requires a large amount of events data out of a wide variety of conditions for sufficient fitting range coverage; and (4) The pressure-to-torque process of a foundation brake mechanical system is in general isolated from a truck's external conditions and contains a slow time variance. Considering the above factors, using an online static model has benefits that outweigh the limitations, and thus, the parameters remain non-adaptive in some implementations.

However, using online static parameters for the pressure-to-torque response model does not imply the brake control system is non-adaptive to a vehicle's changing operating conditions. As the model provides online estimation of wheel brake torque, an external parameter estimation block that online adapts the vehicle torque-to-acceleration response, captures the overall brake response changes by factors such as towing load, brake temperature, or brake wear conditions. A degraded torque-to-acceleration response parameter will result in higher wheel brake torque demand from the wheel domain optimal control problem, when handling the same kinematic level of state demand from the control upper stream, and the difference will equally reflect onto the brake air pressure demand. Therefore, the wheel torque estimation from the foundation air brake torque deliver model does not have to be absolutely precise on vehicle condition variance, but only needs to reflect the nominal response under sufficiently identified data input conditions. Impacts of online bias can be absorbed by the upstream online estimation at driving dynamic level.

Figure 4:
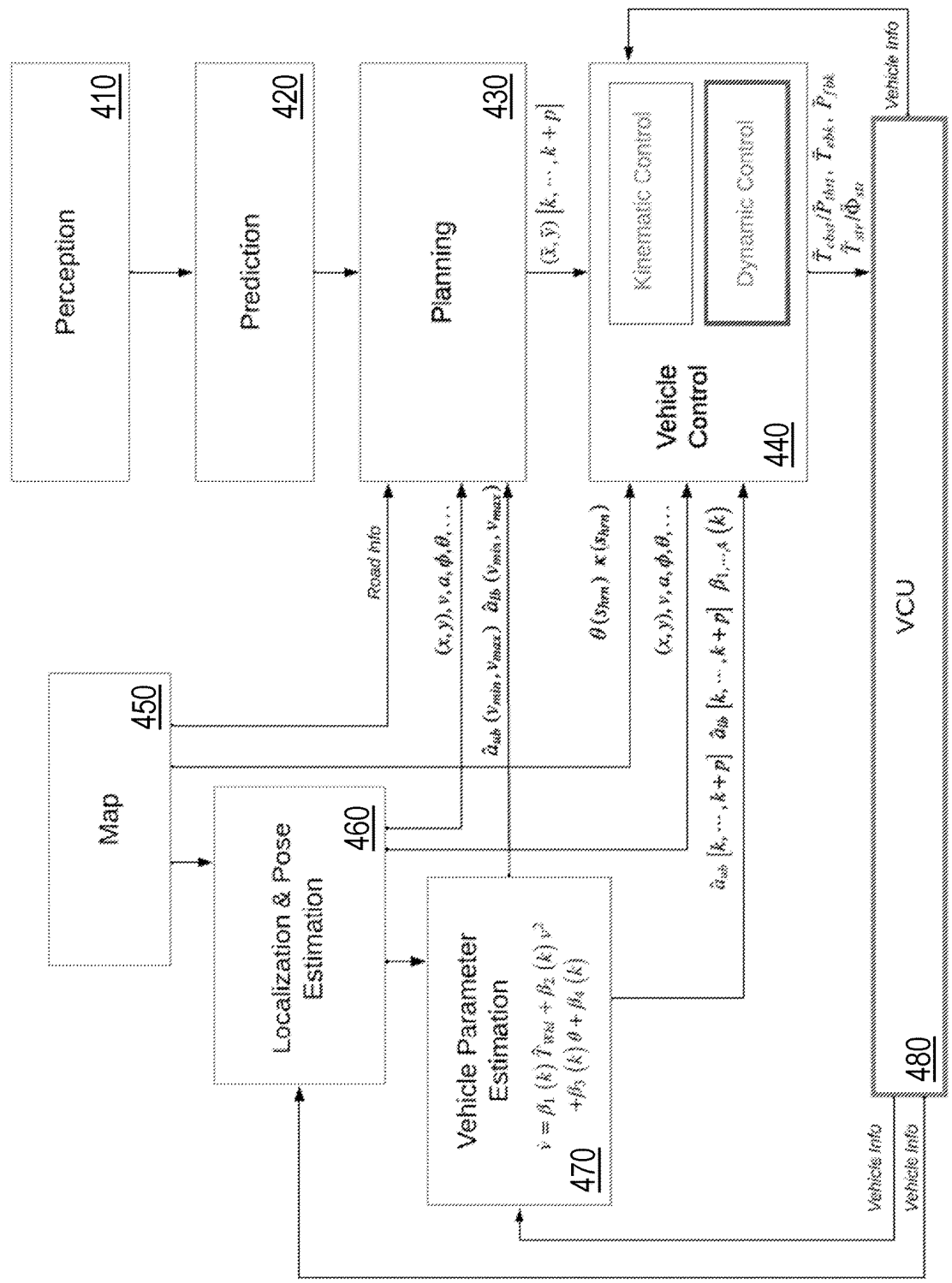
FIG. 4 shows an example system architecture of a longitudinal dynamic control compared to the modules of an autonomous driving system.

This functionality relationship is shown in FIG. 4. As shown therein, an example autonomous driving system may include a perception module 410, a prediction module 420, a planning (or mission planning) module 430, a vehicle control module 440, a map module 450, a localization and pose estimation module 460, a vehicle parameter estimation module 470, and a vehicle control unit (VCU) 480. In some embodiments, perception module 410 and prediction module 420 can be configured to provide a context for driving situations, label the states of various nearby vehicles, identify instantaneous driving intentions, and predict future states of key neighboring vehicles. In some embodiments, planning module 430 can be configured to use an abstracted ego vehicle motion model into the aforementioned driving situation context and generate an abstracted driving mission plan for a few seconds into the future.

In some embodiments, the offline static model can be generated for a newly designed vehicle, e.g., a vehicle that uses a new component or has an entirely new configuration compared to other vehicles in the fleet. The offline model is calibrated for each type of braking system being installed on each type of vehicle chassis and can efficiently capture the purely mechanical subsystems that are part of the system. In this example, the online adaptive model accounts for environmental parameters and the like, e.g., parameters that are external to the hardware of the vehicle and its braking system.

In some embodiments, the usage of the brake wheel torque can be leveraged to determine which models should be offline static and which models should be online adaptive.

2.3 Foundation Brake Anti-Lag Solver Algorithm

Figure 5A:
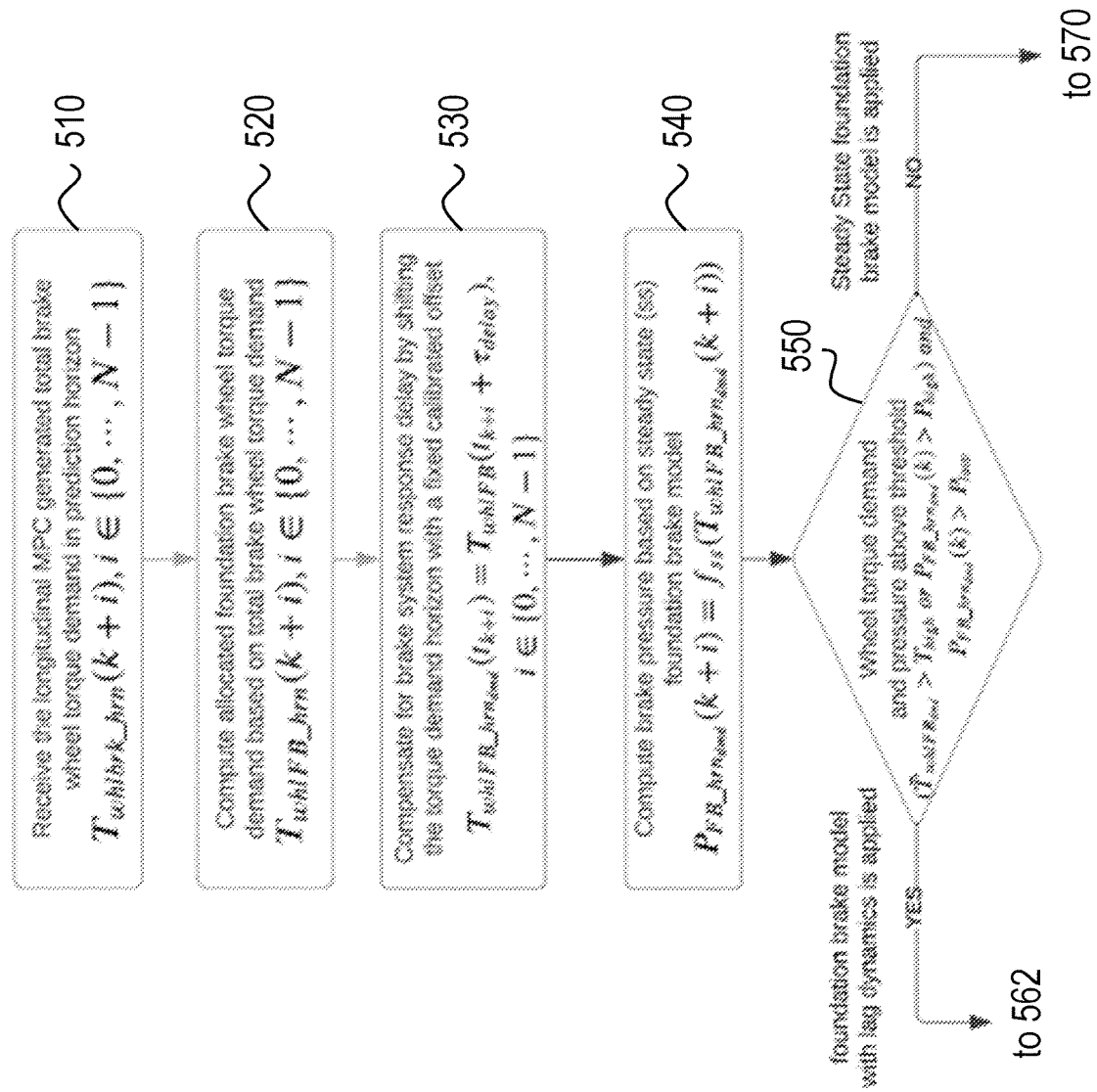

The flow chart of the algorithm for determining brake pressure demand is shown in FIGS. 5A and 5B. As shown therein, the algorithm starts with the total brake wheel torque horizon being computed from longitudinal MPC that is received (510), using which the foundation brake wheel torque horizon is computed (520). Then it uses the steady state response model to convert torque to pressure demand (540). Based on the condition specified in FIG. 5A, chart (550) the foundation brake model type may be selected.

2.4 Pressure Demand Determination Using the Lag Model

2.4.1 Overview of the Shooting Method for BVPs

In order to solve for the pressure demand to minimize wheel brake torque tracking error, a variation of the shooting algorithm called the secant method is used, which is an approach commonly used for solving a boundary value problem (BVP). A formulation technique on including actuation constraints to the commonly seen unconstrained shooting process is developed, to handle the practical brake system pressure limitations.

The input and the output of the BVP are selected based on the problem formulation. The algorithm can be described as follows. Initially, it is assumed there are k steps of outputs, and the system is a single input single output system. The goal is to track a given reference trajectory for the output signal. Output tracking error can be described in matrix form $E=f(y, y_{target})$ Denote the system input at each iteration n for each instance to be determined as $\vec{X}_n=[X_1 \ X_2 \ \ldots \ X_k]^T$ and the corresponding tracking error matrix is $\vec{F}(\vec{X})$, which is the BVP output, which is defined as:

$$\vec{F}_n(\vec{X}_n)=[F_n(1) \ F_n(2) \ \ldots \ F_n(k)]^T.$$

The interpretation of this expression is that index n indicates the nth direction iteration of perturbation while k denotes the kth instance correspondent target tracking objective value.

The shooting algorithm starts by creating perturbations to each input instance and observing the response differences on the output channels, to construct a very rough initial estimate of the Jacobian. $X_0$ denotes the initial input for the shooting algorithm. It is noted that the Jacobian only needs to be computed at the initial guess iteration by using small perturbations in each direction. After the first step, Broyden's Method will be used to update Jacobian for the subsequent steps. The Xi matrix and Fi matrix are defined as the unique matrices only for the initialization of the Jacobian matrix.

$$\vec{X}_{i_0} = [X_0(1) \ X_0(2) \ \ldots \ X_0(k)]^T \quad (110)$$

$$\vec{X}_{i_1} = [X_0(1)+\Delta X_0(1) \ X_0(2) \ \ldots \ X_0(k)]^T \quad (111)$$

$$\vec{X}_{i_2} = [X_0(1) \ X_0(2)+\Delta X_0(2) \ \ldots \ X_0(k)]^T \quad (112)$$

...

$$\vec{X}_{i_k} = [X_0(1) \ X_0(2) \ \ldots \ X_0(k)+\Delta X_0(k)]^T \quad (113)$$

Herein, $$\vec{F}_{i_j}(\vec{X}_{i_h})=[Fi_j(1) Fi_j(2) \ldots Fi_j(k)], j\in[1,k]$$

is used to represent the vector for each instance's output tracking error given the jth perturbation direction. Based on the definition of Jacobian, Eq. (114) can be obtained. In Eq. (114), each row represents the sensitivity of different perturbation direction on the instance defined by row index while the column direction represents the sensitivity on different instance with the same perturbation defined by column index.

$$\vec{A}_n = \begin{bmatrix} \frac{Fi_1(1)-Fi_0(1)}{\Delta X_0(1)} & \frac{Fi_2(1)-Fi_0(1)}{\Delta X_0(2)} & \cdots & \frac{Fi_k(1)-Fi_0(1)}{\Delta X_0(k)} \\ \frac{Fi_1(2)-Fi_0(2)}{\Delta X_0(1)} & \frac{Fi_2(2)-Fi_0(2)}{\Delta X_0(2)} & \cdots & \frac{Fi_1(2)-Fi_0(2)}{\Delta X_0(k)} \\ \vdots & \vdots & \ddots & \vdots \\ \frac{Fi_1(k)-Fi_0(k)}{\Delta X_0(1)} & \frac{Fi_2(k)-Fi_0(k)}{\Delta X_0(2)} & \cdots & \frac{Fi_k(k)-Fi_0(k)}{\Delta X_0(k)} \end{bmatrix} \quad (114)$$

Once the Jacobian is computed numerically from initial guess, the next iteration input instance vector is obtained.

$$\vec{X}_{n+1}=\vec{X}_n-\vec{A}_n^{-1}\vec{F}(\vec{X}_n) \quad (115)$$

The estimation of Jacobian can be acquired based on the new input vector:

$$\Delta \vec{X}_n = \vec{X}_{n+1} - \vec{X}_n \quad (116)$$

$$\Delta \vec{F}_n = \vec{F}(\vec{X}_{n+1}) - \vec{F}(\vec{X}_n) \quad (117)$$

$$\vec{A}_{n+1} = \vec{A}_n + \frac{(\Delta \vec{F}_n - \vec{A}_n \Delta \vec{X}_n)\Delta \vec{X}_n^T}{\Delta \vec{X}_n^T \Delta \vec{X}_n} \quad (118)$$

The algorithm keeps iterating as described above till the terminating condition below is met or the maximum number of iterations is exceeded.

$$\vec{F}(\vec{X}_n)^T \vec{F}(\vec{X}_n) < \epsilon$$

If at the nth iteration step, the m-th shooting variable $X_n(m)$ is equal to a value that exceeds the constraint $X^C(m)$, which originates from the practical brake system limitations of minimum and maximum brake pressure that can be reliably generated, then the actual m-th shooting variable uses the truncated value $$\overline{X}_n(m)=\min(\max(X_n(m),X_{lb}),X_{ub})$$

for the model response prediction, but adds the shooting error with a barrier penalty:

$$B_n(m)=\text{sign}(F_n(m)) \cdot q_m(\overline{X}_n(m)-X_n(m))^2 \quad (120)$$

Herein, $q_m$ is a scalar that is used to tune the aggressiveness of the barrier penalty. The barrier penalty augments the shooting error at the truncated value by the amount of constraint violation, and the influence is zero when within the constraint. This is achieved because when the constraints are not violated, $\underline{X}_n(m)-X_n(m)$ drops to zero, which turns off the barrier penalty term.

$$\vec{F}_{aug_n}(\ldots,X_n(k))=\vec{F}_n(\ldots,\overline{X}_n(k))+\vec{B}_n \quad (121)$$

The barrier augmented error vector $\vec{F}_{aug_n}$ substitutes the actual error vector $\vec{F}_n$ in the shooting iteration. The actual error vector $\vec{F}_n$ is logged and used to observe convergence.

2.4.2 Brake Pressure Determination

The shooting algorithm described in the above section is applied to generate pressure trace reference for the wheel torque tracking problem. The actual implementation involves the input and output selection, model for prediction and the objective function (e.g., tracking error) design.

The goal is to minimize the difference between longitudinal MPC generated $T_{whlFB\_hrn_{dmd}}$ and the model (described in Section 2.2) predicted $\hat{T}_{whlFB_k}$ given the BVP input.

The BVP input is foundation brake pressure trace based on actuator interface selection (the pressure interface mentioned in Section 2.1.2). The BVP output is the vector of objective function (Eq. (122)) for the foundation brake wheel torque tracking error. On top of tracking error, the barrier penalty (Eq. (120)) term $Q_b(n)E(n)X_{bd}(n)$ is added to enforce pressure constraints.

The objective function computation are provided. The 1, 2, . . . , k in equations below denotes the index for each step in the prediction horizon. Given the formulation, the pressure command minimizing the tracking to target wheel torque can be generated.

$$\vec{F} = [Q_b(1)\text{sign}(E(1))X_{bd}(1)+E(1) \ldots Q_b(k)\text{sign}(E(k)) X_{bd}(k)+E(k))]^T \quad (122)$$

$$P_{bd}(i)=\min(\max(P(i),P_{lb})P_{ub}), i \in [1,k] \quad (123)$$

$$X_{bd} = [(P_{bd}(1)-P(1))^2 (P_{bd}(2)-P(2))^2 \ldots (P_{bd}(k)-P(k))^2] \quad (124)$$

$$E = [\hat{T}_{whlFB}(1)-T_{whlFB\_hrn_{dmd}}(1)\hat{T}_{whlFB}(2)- T_{whlFB\_hrn_{dmd}}(2) \ldots \hat{T}_{whlFB}(k)-T_{whlFB\_hrn_{dmd}}(k)] \quad (125)$$

The algorithm to solve the defined BVP is summarized in FIG. 6. The termination condition is either when $\|E\|^2 < \epsilon$ (user defined convergence tolerance) or when the maximum number of iterations is exceeded.

2.4.3 Validation of Anti-Lag Solver Efficacy

The validation process is divided into two pieces. The first one is the effectiveness of the lag model based on actual data scenario. The second one is the precise prediction of pressure trace given the actual wheel torque sensed from the vehicle.

Figure 7A:
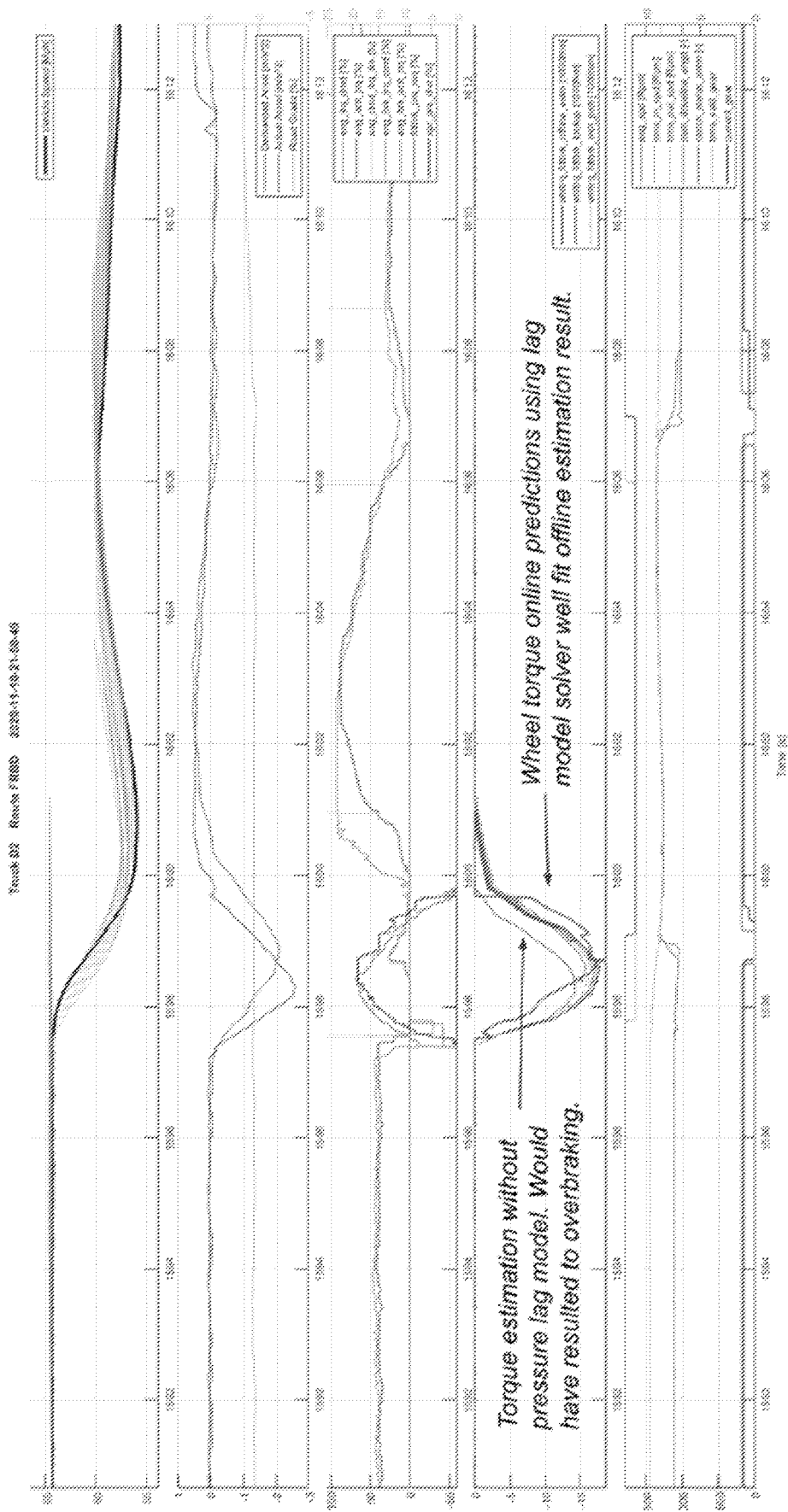
FIGS. 7A and 7B show examples of the efficacy of the described anti-lag solver in preventing overshoot in the brake pressure commands.
Figure 7B:
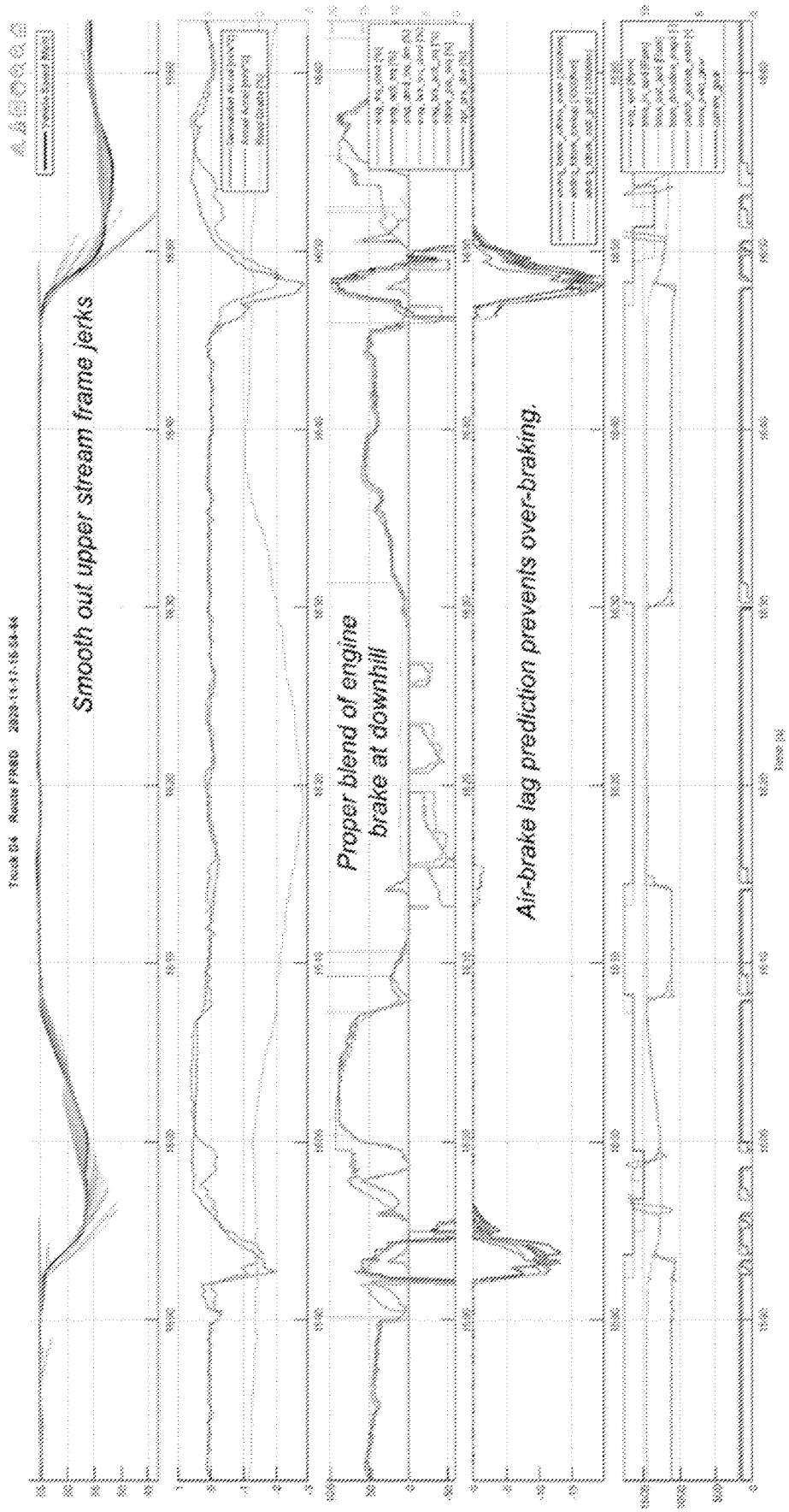

The purpose of incorporating lag dynamics is to predict the lag effect in wheel torque, and thus avoid overshoot in controlled vehicle acceleration delivery. To show the advantage of lag model, both steady state model and transient model are used to predict foundation brake wheel torque to compare with the semi-ground truth. The result is presented in the fourth subplot of FIG. 7A, the line generated by only using steady state response is compared to the line obtained by anti-lag solver. Given the prediction results from steady state model without lag dynamics, a controller (e.g., PID) will cause overshoot in pressure command. The result shows that the anti-lag solver is able to predict the delay reflected in actual wheel torque delivery, and thus prevent overshoot in vehicle deceleration (subplot 2). A similar case is shown in FIG. 7B, where after 1640 second, the anti-lag solver generated pressure command prevents overshoot as expected.

3 Delay Simulation and Compensation

The vehicle system pipeline may have a time delay from measurement to execution. The amount of time delay is relatively constant and can be approximated. The disclosed embodiments can pre-compensate for this delay at the controller to improve response timeliness and accuracy. In particular for longitudinal control, this can be addressed in the longitudinal MPC algorithm using a 1-step predictor to re-align the execution time stamp.

4 Example Implementations of the Disclosed Technology

Embodiments of the disclosed technology provide, inter alia, the following features, benefits, and advantages:

- A model-based solution to counteract the negative impact of the lag effect of pressure-to-torque response based on analyzing the pneumatic nature and the non-rigid body characteristics of a heavy-duty truck foundation air brake system;
- A blended model that fully captures the response characteristics in a continuous combination of a steady-state model and a transient-state model;
- Handling of the non-observability of intermediate states of brake response, online estimation processes are developed to generate signals of total wheel torque delivery, foundation wheel brake torque delivery developed to generate signals of total wheel torque delivery, foundation wheel brake torque delivery. A data processing pipeline has been made for sufficiently capturing sparse event data of hard braking out of a large quantity of test logs, in order to minimize over-fitting risk when handling noisy secondary estimation results as model fitting inputs;
- Utilizing the wheel brake torque demand horizon information from the upper-level MPC at the wheel torque domain, the lag impact is mitigated by reverse solving the air brake lag model over a future prediction horizon. The solver process is treated as an actuation domain sub-problem, by decoupling the brake torque demand from the powertrain source, and therefore reducing the computational complexity at the quadratic level;
- Handling the system model nonlinearity per dynamical demand changes by using a customized shooting algorithm for the sub-optimization problem, with practical actuation constraints handling and fast convergence rate for online computation;
- The sub-controller on foundation air brake re-uses the adaptive control's architecture at wheel domain, by handling driving condition variance adaption at torque-to-acceleration level, while avoiding a risky and complicated secondary online estimation process for sparse and noisy data of pressure-to-torque response;
- Provides consistent precision and reliability with L4 autonomous control in the aspects of predictable system response, controllable error variance, and analyzable control decisions.

Figure 8:
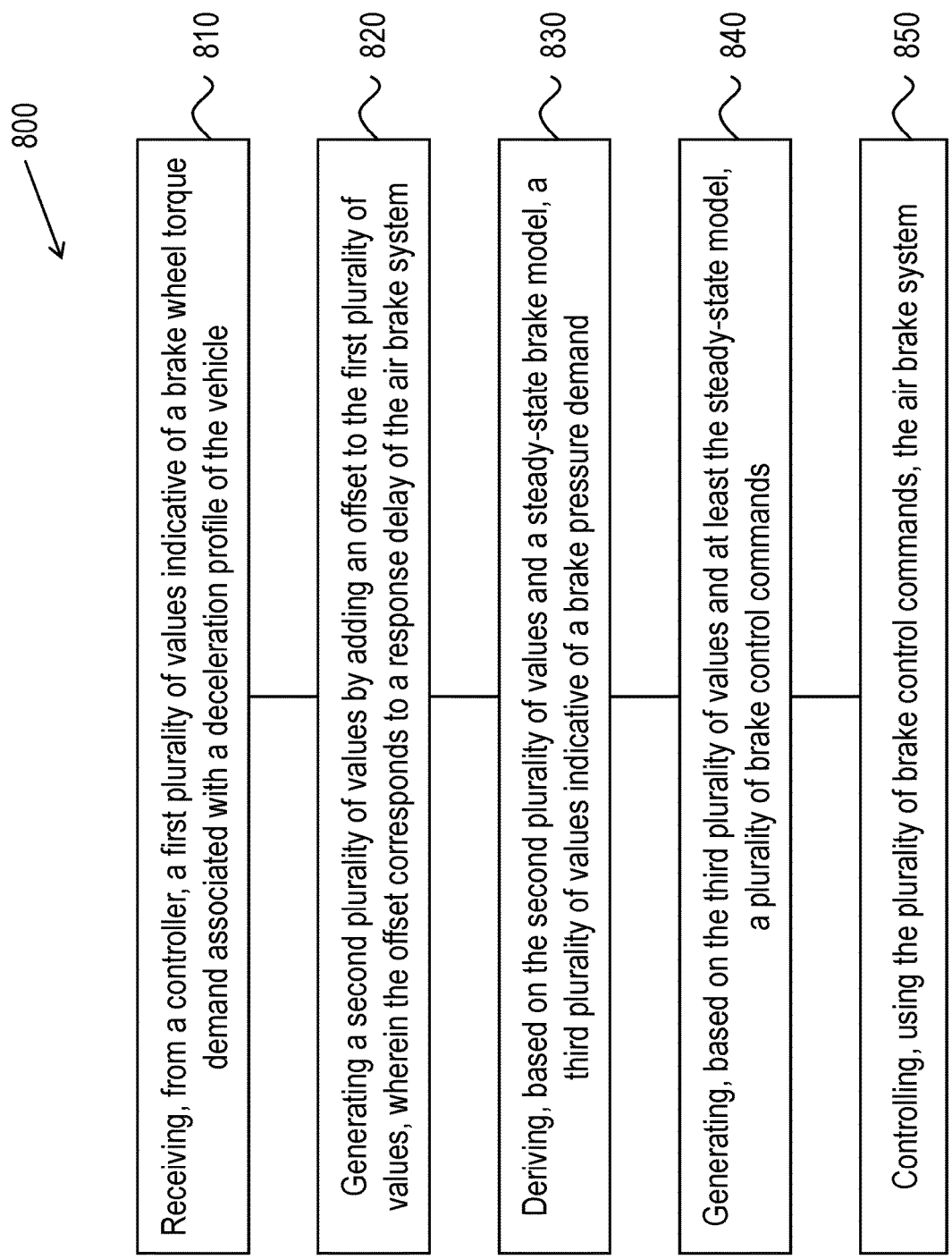
FIG. 8 shows a flowchart of an example method for controlling a vehicle.

FIG. 8 shows a flowchart for an example method 800 of controlling a vehicle. The method 800 can be implemented as one or more computer program products, e.g., one or more modules of computer program instructions encoded on a tangible and non-transitory computer readable medium for execution by, or to control the operation of, data processing apparatus. The method 800 includes, at operation 810, receiving, from a controller, a first plurality of values indicative of a brake wheel torque demand associated with a deceleration profile of the vehicle.

The deceleration profile may comprise, for example, a functional relationship between how much torque is needed to be applied to wheels to achieve specific amount of deceleration. The deceleration profile may be modeled as an equation (e.g., a linear approximation for computational simplicity) or may be implemented as a look-up table of values of deceleration and corresponding wheel torque requirements.

The method 800 includes, at operation 820, generating a second plurality of values by adding an offset to the first plurality of values, wherein the offset corresponds to a response delay of the air brake system.

The method 800 includes, at operation 830, deriving, based on the second plurality of values and a steady-state brake model, a third plurality of values indicative of a brake pressure demand, wherein an input to the steady-state brake model comprises the brake pressure demand and at least one previous brake wheel torque demand, and wherein an output of the steady-state brake system comprises a current brake wheel torque demand.

The steady-state brake model may represent, in a numerical manner such as a mathematical equation or a set of look-up table values, response of a brake system to input torque/pressure. Here, there might be an initial transient period during which the brake response fluctuates after an initial application of a braking torque (e.g., due to inertia of shape imperfections). After the initial transient period, the brake may behave closely as the model represents. However, the steady-state brake model may be used for the entirety of time duration, including the transient period and the steady-state period.

The method 800 includes, at operation 840, generating, based on the third plurality of values and at least the steady-state model, a plurality of brake control commands.

The method 800 includes, at operation 850, controlling, using the plurality of brake control commands, the air brake system.

Figure 9:
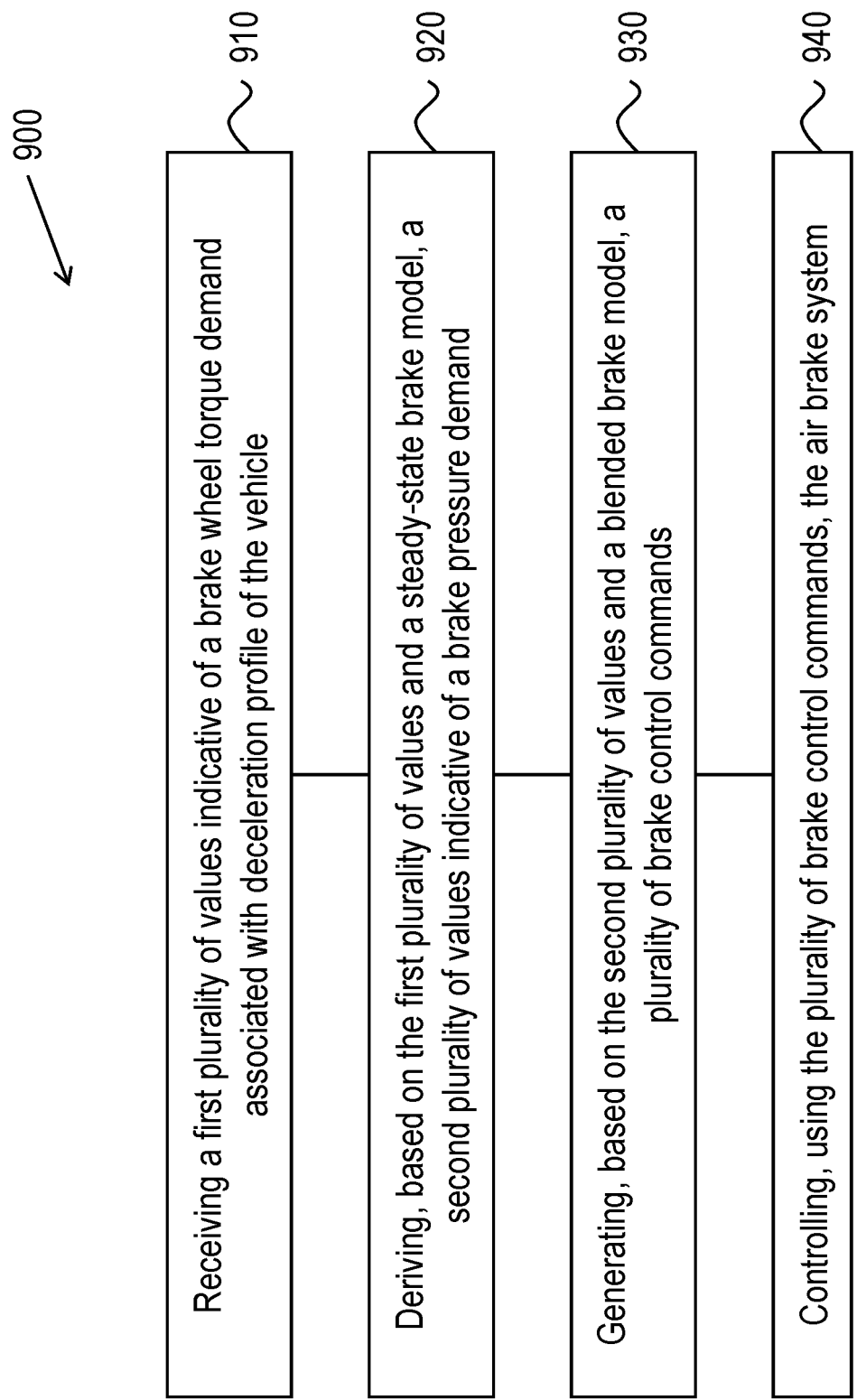
FIG. 9 shows a flowchart for another example method for controlling a vehicle.

FIG. 9 shows a flowchart for an example method 900 of controlling a vehicle. The method 900 can be implemented as one or more computer program products, e.g., one or more modules of computer program instructions encoded on a tangible and non-transitory computer readable medium for execution by, or to control the operation of, data processing apparatus. The method 900 includes, at operation 910, receiving a first plurality of values indicative of a brake wheel torque demand associated with deceleration profile of the vehicle.

The method 900 includes, at operation 920, deriving, based on the first plurality of values and a steady-state brake model, a second plurality of values indicative of a brake pressure demand.

The method 900 includes, at operation 930, generating, based on the second plurality of values and a blended brake model, a plurality of brake control commands.

The method 900 includes, at operation 940, controlling, using the plurality of brake control commands, the air brake system.

In some embodiments, the blended model is the steady-state model when each of the second plurality of values is less than a threshold and the blended model is a weighted sum of the steady-state brake model and a transient-state brake model when at least one of the second plurality of values is greater than the threshold, the transient-state brake model is a first-order lag model, and an output of the transient-state brake model comprises a (k+1)-th lag-adjusted brake wheel torque demand, wherein an input to the transient-state model comprises a k-th lag-adjusted brake wheel torque demand, a k-th brake pressure demand, a derivative of the k-th brake pressure demand, and a k-th steady-state brake wheel torque demand, and wherein k is an integer indicative of a time step.

Figure 10:
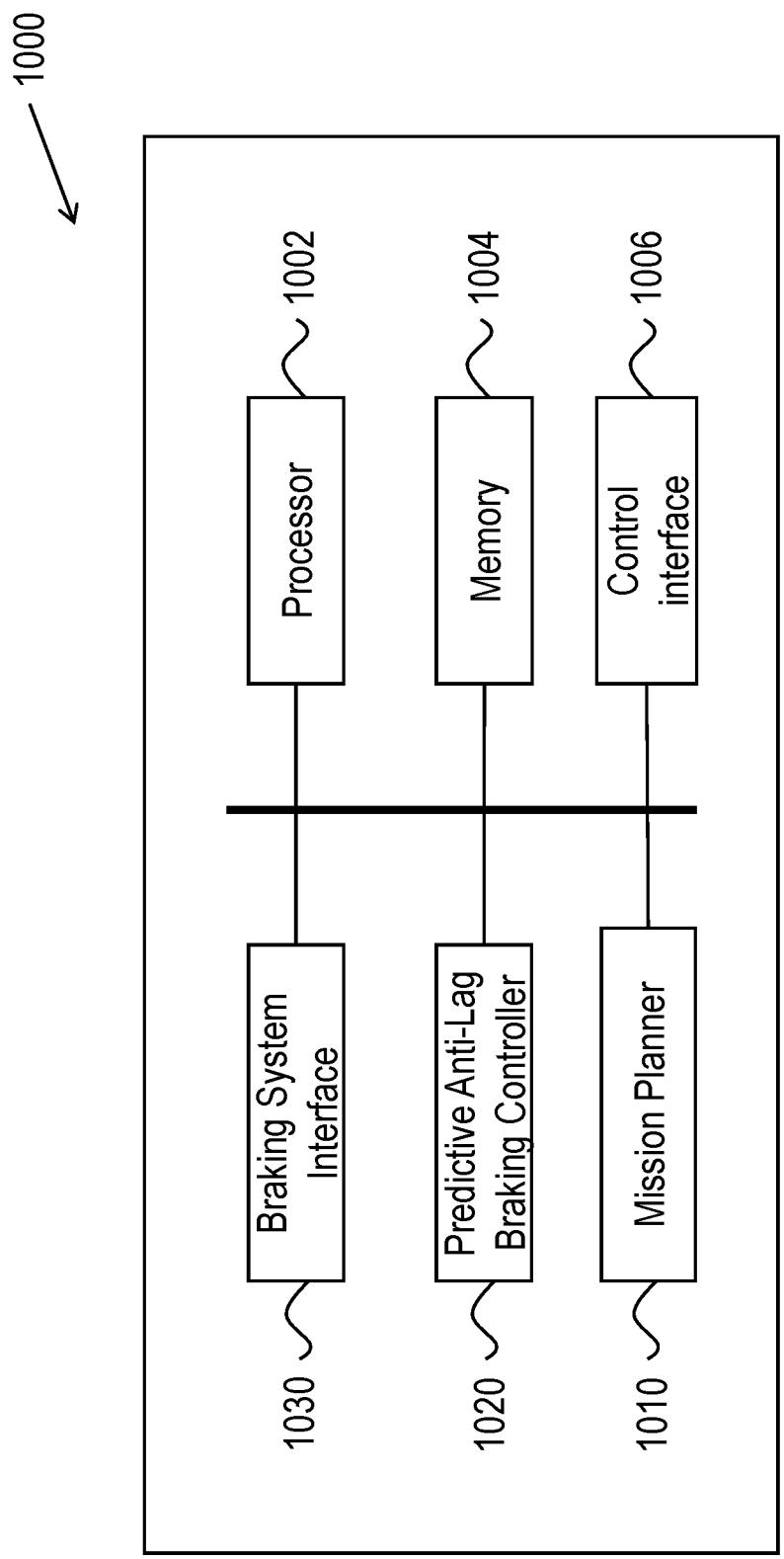
FIG. 10 shows an example of a hardware platform that can implement some methods and techniques described in the present document.

FIG. 10 shows an example of a hardware platform 1000 that can be used to implement some of the techniques described in the present document. For example, the hardware platform 1000 may implement methods 800 or 900 or may implement the various modules described herein. The hardware platform 1000 may include a processor 1002 that can execute code to implement a method. The hardware platform 1000 may include a memory 1004 that may be used to store processor-executable code and/or store data. The hardware platform 1000 may further include a control interface 1006. For example, the control interface 1006 may implement one or more intra-vehicular communication protocols. The hardware platform may further include a mission planner 1010, a predictive anti-lag braking controller 1020, and a braking system interface 1030. In some embodiments, some portion or all of the mission planner 1010 and/or the predictive anti-lag braking controller 1020 may be implemented in the processor 1002. In other embodiments, the memory 1004 may comprise multiple memories, some of which are exclusively used by the mission planner, predictive anti-lag braking controller and/or braking system interface.

Various embodiments according to the present document preferably adopt the following technical solutions.

1. A method of controlling a vehicle with an air brake system, comprising: receiving, from a controller, a first plurality of values indicative of a brake wheel torque demand associated with a deceleration profile of the vehicle; generating a second plurality of values by adding an offset to the first plurality of values, wherein the offset corresponds to a response delay of the air brake system; deriving, based on the second plurality of values and a steady-state brake model, a third plurality of values indicative of a brake pressure demand, wherein an input to the steady-state brake model comprises the brake pressure demand and at least one previous brake wheel torque demand, and wherein an output of the steady-state brake system comprises a current brake wheel torque demand; generating, based on the third plurality of values and at least the steady-state model, a plurality of brake control commands; and controlling, using the plurality of brake control commands, the air brake system.

2. The method of solution 1, wherein the controller comprises a longitudinal dynamic model predictive control controller.

3. The method of solution 1, wherein the generating the plurality of brake control commands excludes a use of the transient-state brake model in response to each of the third plurality of values being less than or equal to the threshold.

4. The method of solution 1, wherein the generating the plurality of brake control commands is further based on a transient-state brake model in response to at least one of the third plurality of values being greater than a threshold.

5. The method of solution 4, wherein the generating the plurality of brake control commands is based on a blended brake model that is a weighted sum of the steady-state brake model and the transient-state brake model.

6. The method of solution 5, wherein a weight of the weighted sum is based on the brake pressure demand.

7. The method of solution 5, wherein the blended brake model is configured to minimize a tracking error of the brake wheel torque demand over a duration of the deceleration profile.

8. The method of solution 7, wherein minimizing the tracking error comprises iteratively solving a constrained boundary value problem using a quasi-Newton method or a secant method.

9. The method of solution 8, wherein the iteratively solving the constrained boundary value problem comprises: checking, at an n-th iteration, whether an m-th variable representing an input to the n-th iteration exceeds a practical brake system limitation; and truncating the m-th variable, upon determining that the m-th variable exceeds the practical brake system limitation, using a truncation rule, wherein m and n are positive integers.

10. The method of solution 9, wherein the truncation rule is based on an upper bound and a lower bound associated with the tracking error.

11. The method of solution 8, wherein the iteratively solving the constrained boundary value problem comprises using a barrier penalty that can adjusted using a scalar quantity.

12. The method of solution 1, wherein the response delay is based on at least one of a hardware design of the foundation air brake system, a software version of the foundation air brake system, or a maintenance condition of the vehicle.

13. The method of solution 12, wherein the response delay is between a maximum delay value and a minimum delay value.

14. The method of solution 13, wherein the maximum delay value is 2.0 seconds, and wherein the minimum delay value is 0.01 seconds.

15. The method of solution 1, wherein the deceleration profile comprises a plurality of speed values, each of the speed values corresponding to a target speed at a future time instant.

16. The method of solution 1, wherein the vehicle is an autonomous vehicle is operating in a Society of Automotive Engineers (SAE) Level 4 (L4) automation mode.

17. A method of controlling a vehicle with an air brake system, comprising: receiving a brake wheel torque demand associated with a deceleration of the vehicle; generating, based on the brake wheel torque demand, a brake pressure demand using a steady-state model and a transient-state model, wherein the transient-state model accounts for a response lag due to one or more pneumatic components of the air brake system; generating, based on the brake pressure demand, brake control commands; and controlling the vehicle using the brake control commands.

18. The method of solution 17, wherein receiving the brake wheel torque demand comprises receiving an estimate of the brake wheel torque demand in response to the brake wheel torque demand not being directly observable.

19. The method of solution 17, wherein the brake pressure is an input to the steady-state and the transient-state models, and wherein the brake wheel torque demand is an output of the steady-state and the transient-state models.

20. A method for controlling a vehicle with an air brake system, comprising: receiving a first plurality of values indicative of a brake wheel torque demand associated with deceleration profile of the vehicle; deriving, based on the first plurality of values and a steady-state brake model, a second plurality of values indicative of a brake pressure demand; generating, based on the second plurality of values and a blended brake model, a plurality of brake control commands; and controlling, using the plurality of brake control commands, the air brake system, wherein the blended model is the steady-state model when each of the second plurality of values is less than a threshold and the blended model is a weighted sum of the steady-state brake model and a transient-state brake model when at least one of the second plurality of values is greater than the threshold, wherein the transient-state brake model is a first-order lag model, wherein an output of the transient-state brake model comprises a (k+1)-th lag-adjusted brake wheel torque demand, wherein an input to the transient-state model comprises a k-th lag-adjusted brake wheel torque demand, a k-th brake pressure demand, a derivative of the k-th brake pressure demand, and a k-th steady-state brake wheel torque demand, and wherein k is an integer indicative of a time step.

21. The method of solution 20, wherein a weight of the weighted sum is based on a ratio of the k th brake pressure demand and a minimum brake pressure demand.

22. The method of solution 20, wherein a rate of change of the lag-adjusted brake wheel torque demand is proportional to the brake pressure demand.

23. The method of solution 20, wherein the steady-state brake model comprises a pressure-torque correlation derived using a linear least-squares method.

24. The method of solution 23, wherein the steady-state model is configured to exclude one or more effects from road grade, driveline friction, or driveline disturbances in gear shifting, and wherein the steady-state model is configured to include a torque effect from a foundation air brake system.

25. The method of solution 23, wherein the steady-state model is independent of a hardware design of the foundation air brake system.

26. The method of solution 20, wherein the blended brake model is configured to minimize a tracking error of the brake wheel torque delivery over the demand over caused by a duration of the speed reduction profile.

27. The method of solution 26, wherein minimizing the tracking error comprises solving a boundary value problem using a quasi-Newton method or a secant method.

28. The method of solution 20, wherein the vehicle is an autonomous vehicle is operating in a Society of Automotive Engineers (SAE) Level 4 (L4) automation mode.

29. An apparatus for controlling a vehicle, comprising: a processor; and a memory, coupled to the processor, comprising instructions, wherein the instructions upon execution by the processor causing the processor to implement one or more methods of solutions 1 to 28.

In the above-described embodiments, the longitudinal dynamic model may involve engine behavior, tire tractive force generation, resistive forces acting on the vehicle and the gearshifting, represented in a numerical manner such as a function or a look-up table.

U.S. patent application Ser. No. 18/341,121, which discloses techniques for wheel torque estimation in an autonomous driving application scenario is incorporated herein by reference in its entirety.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method of controlling a vehicle with an air brake system, comprising:
   receiving, from a controller, a first plurality of values indicative of a brake wheel torque demand associated with a deceleration profile of the vehicle;
   generating a second plurality of values by adding an offset to the first plurality of values, wherein the offset corresponds to a response delay of the air brake system;
   deriving, based on the second plurality of values and a steady-state brake model, a third plurality of values indicative of a brake pressure demand, wherein an input to the steady-state brake model comprises the brake pressure demand and at least one previous brake wheel torque demand, and wherein an output of the steady-state brake system comprises a current brake wheel torque demand;
   generating, based on the third plurality of values and at least the steady-state model, a plurality of brake control commands; and
   controlling, using the plurality of brake control commands, the air brake system,
   wherein the generating the plurality of brake control commands is further based on a transient-state brake model in response to at least one of the third plurality of values being greater than a threshold,
   wherein the generating the plurality of brake control commands is based on a blended brake model that is a weighted sum of the steady-state brake model and the transient-state brake model,
   wherein the blended brake model is configured to minimize a tracking error of the brake wheel torque demand over a duration of the deceleration profile,
   wherein minimizing the tracking error comprises iteratively solving a constrained boundary value problem using a quasi-Newton method or a secant method,
   wherein the iteratively solving the constrained boundary value problem comprises using a barrier penalty that can adjusted using a scalar quantity.

2. The method of claim 1, wherein the controller comprises a longitudinal dynamic model predictive control controller.

3. The method of claim 1, wherein the generating the plurality of brake control commands excludes a use of a transient-state brake model in response to each of the third plurality of values being less than or equal to a threshold.

4. The method of claim 1, wherein a weight of the weighted sum is based on the brake pressure demand.

5. The method of claim 1, wherein the deceleration profile comprises a plurality of speed values, each of the speed values corresponding to a target speed at a future time instant.

6. A non-transitory computer readable medium storing executable instructions for a vehicle with an air brake system that, when executed by at least one processor, cause the at least one processor to perform at least the following:
receive a first plurality of values indicative of a brake wheel torque demand associated with deceleration profile of the vehicle;
derive, based on the first plurality of values and a steady-state brake model, a second plurality of values indicative of a brake pressure demand;
generate, based on the second plurality of values and a blended brake model, a plurality of brake control commands; and
control, using the plurality of brake control commands, the air brake system,
wherein the blended model is the steady-state model when each of the second plurality of values is less than a threshold and the blended model is a weighted sum of the steady-state brake model and a transient-state brake model when at least one of the second plurality of values is greater than the threshold,
wherein the transient-state brake model is a first-order lag model,
wherein an output of the transient-state brake model comprises a (k+1)-th lag-adjusted brake wheel torque demand, wherein an input to the transient-state model comprises a k-th lag-adjusted brake wheel torque demand, a k-th brake pressure demand, a derivative of the k-th brake pressure demand, and a k-th steady-state brake wheel torque demand, and wherein k is an integer indicative of a time step.

7. The non-transitory computer readable medium of claim 6, wherein a weight of the weighted sum is based on a ratio of the k th brake pressure demand and a minimum brake pressure demand.

8. The non-transitory computer readable medium of claim 6, wherein a rate of change of the lag-adjusted brake wheel torque demand is proportional to the brake pressure demand.

9. The non-transitory computer readable medium of claim 6, wherein the steady-state brake model comprises a pressure-torque correlation derived using a linear least-squares method, and
wherein the steady-state model is configured to exclude one or more effects from road grade, driveline friction, or driveline disturbances in gear shifting, and wherein the steady-state model is configured to include a torque effect from a foundation air brake system.

10. The non-transitory computer readable medium of claim 6, wherein the blended brake model is configured to minimize a tracking error of brake wheel torque delivery over the demand caused by a duration of a speed reduction profile.

11. An apparatus for a vehicle with an air brake system, comprising:
at least one processor; and
a memory including executable instructions that, when executed by the at least one processor, cause the apparatus to perform operations comprising:
receiving, from a controller, a first plurality of values indicative of a brake wheel torque demand associated with a deceleration profile of the vehicle;
generating a second plurality of values by adding an offset to the first plurality of values, wherein the offset corresponds to a response delay of the air brake system;
deriving, based on the second plurality of values and a steady-state brake model, a third plurality of values indicative of a brake pressure demand, wherein an input to the steady-state brake model comprises the brake pressure demand and at least one previous brake wheel torque demand, and wherein an output of the steady-state brake system comprises a current brake wheel torque demand;
generating, based on the third plurality of values and at least the steady-state model, a plurality of brake control commands; and
controlling, using the plurality of brake control commands, the air brake system,
wherein the generating the plurality of brake control commands is further based on a transient-state brake model in response to at least one of the third plurality of values being greater than a threshold,
wherein the generating the plurality of brake control commands is based on a blended brake model that is a weighted sum of the steady-state brake model and the transient-state brake model,
wherein the blended brake model is configured to minimize a tracking error of the brake wheel torque demand over a duration of the deceleration profile,
wherein minimizing the tracking error comprises iteratively solving a constrained boundary value problem using a quasi-Newton method or a secant method,
wherein the iteratively solving the constrained boundary value problem comprises:
checking, at an n-th iteration, whether an m-th variable representing an input to the n-th iteration exceeds a practical brake system limitation; and
truncating the m-th variable, upon determining that the m-th variable exceeds the practical brake system limitation, using a truncation rule,
wherein m and n are positive integers, and
wherein the truncation rule is based on an upper bound and a lower bound associated with the tracking error.

12. The apparatus for claim 11, wherein the controller comprises a longitudinal dynamic model predictive control controller.

13. The apparatus for claim 11, wherein the generating the plurality of brake control commands excludes a use of a transient-state brake model in response to each of the third plurality of values being less than or equal to a threshold.

14. The apparatus for claim 11, wherein a weight of the weighted sum is based on the brake pressure demand.

15. The apparatus for claim 11, wherein the deceleration profile comprises a plurality of speed values, each of the speed values corresponding to a target speed at a future time instant.

* * * * *